United States Patent
Kang et al.

(10) Patent No.: US 7,411,410 B2
(45) Date of Patent: Aug. 12, 2008

(54) LCD TEST DEVICE AND TEST PROCESS THEREOF

(75) Inventors: Dong Woo Kang, Gyeongsangbuk-do (KR); Soung Yeoul Eom, Gyeongsangbuk-do (KR); Ki Soub Yang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/644,959

(22) Filed: Dec. 26, 2006

(65) Prior Publication Data

US 2007/0296451 A1 Dec. 27, 2007

(30) Foreign Application Priority Data

Jun. 9, 2006 (KR) .............. 10-2006-0052044
Jun. 9, 2006 (KR) .............. 10-2006-0052045

(51) Int. Cl.
*G01R 31/00* (2006.01)
*G01R 31/28* (2006.01)

(52) U.S. Cl. .................... 324/770; 324/158.1
(58) Field of Classification Search .......... 324/158.1, 324/770
See application file for complete search history.

(56) References Cited

U.S. PATENT DOCUMENTS

| | | | | |
|---|---|---|---|---|
| 5,173,792 A | * | 12/1992 | Matsueda | 349/54 |
| 5,801,545 A | * | 9/1998 | Takekoshi et al. | 324/770 |
| 5,805,246 A | * | 9/1998 | Lee et al. | 349/40 |
| 6,012,509 A | * | 1/2000 | Nonaka | 165/80.2 |
| 6,262,581 B1 | * | 7/2001 | Han | 324/755 |
| 2004/0114089 A1 | * | 6/2004 | Do | 349/158 |
| 2004/0119929 A1 | * | 6/2004 | Tanaka et al. | 349/152 |
| 2005/0243267 A1 | * | 11/2005 | Jeoung et al. | 349/187 |

* cited by examiner

*Primary Examiner*—Vinh P. Nguyen
*Assistant Examiner*—Karen M Kusumakar
(74) *Attorney, Agent, or Firm*—McKenna, Long & Aldridge LLP

(57) ABSTRACT

An LCD test device and a test process thereof are disclosed, in which a defect of an LCD panel is exactly identified through exact electrical connection between an LCD panel and a probe unit. The LCD test device includes a work table on which an LCD panel is mounted, a clamping unit on the work table, clamping a top surface of an edge of the LCD panel mounted on the work table, a probe unit electrically connected with a pad of the LCD panel fixed to the work table by the clamping unit, and a back light unit supplying light to the LCD panel fixed to the work table. Accordingly, since the defect of the LCD panel can be tested exactly, reliability of the test is improved, and it is possible to prevent yield and the cost from being reduced in advance.

24 Claims, 12 Drawing Sheets

LCD TEST DEVICE AND TEST PROCESS THEREOF

This application claims the benefit of Korean Patent Application Nos. P2006-0052044, filed on Jun. 9, 2006, and P2006-0052045, filed on Jun. 9, 2006, both which are hereby incorporated by reference for all purposes as if fully set forth herein.

BACKGROUND OF THE INVENTION

1. Field of the Invention

The present invention relates to a test device for a panel of a liquid crystal display (LCD) device, and more particularly, to an LCD test device and a test process thereof, in which an improved structure is provided for exact electrical connection between an LCD panel and a probe unit.

2. Discussion of the Related Art

Generally, an LCD test device is designed for easy testing with the naked eye whether an LCD panel has a defect.

FIG. 1 is a front view illustrating a related art LCD test device, and FIG. 2 is a side view illustrating a related art LCD test device.

As shown in FIGS. 1 and 2, the related art LCD test device includes a test unit 2 arranged at one side of a main body 1 to test an LCD panel 10, and a loading/unloading unit 7 arranged at one side of the test unit 2 to load and unload the LCD panel 10.

The related art LCD test device further includes a carrier 9 movably arranged in both directions to carry the LCD panel 10 from the loading/unloading unit 7 to the test unit 2 or from the test unit 2 to the loading/unloading unit 7.

The test unit 2 includes a probe unit 3 and a work table 4 connecting the LCD panel to the probe unit 3 and supplying a light source. The work table 4 includes a polarizer 4a and a back light unit 4b. A moving stage 5 is at the rear of the work table 4 to align the work table 4 with the probe unit 3 and connect the work table 4 with the probe unit 3.

The loading/unloading unit 7 had a sub table 8 that tilts the LCD panel 10 carried from a loader (not shown) at a predetermined angle (for example, 60°).

Also, a microscope 6 is provided, which is movable in all directions at the front of the test unit 2, to allow a worker to more precisely identify an error found during test of the LCD panel 10 with the naked eye.

The process of testing the LCD panel using the related art LCD test device will be described in brief.

First, the LCD panel 10 is transferred from the loader of the loading/unloading unit 7 to the sub table 8, and the sub table 8 is tilted at a predetermined angle to transfer the LCD panel 10 to the carrier 9.

Subsequently, the carrier 9 carries the LCD panel 10 to the test unit 2. If the LCD panel 10 to be tested is arranged in the test unit 2, the work table 4 is moved by driving of the moving stage 5 to fix the LCD panel 10 of the carrier 9 using a vacuum suction, and the work table 4 connects a pad (not shown) of the fixed LCD panel 10 to a lead pin (not shown) of the probe unit 3.

If the LCD panel 10 is electrically connected with the probe unit 3, a predetermined image signal is applied through the probe unit 3 and at the same time illumination of the back light unit 4b is changed to various patterns by a pattern generator (PG) which is an external image signal input unit, so that the worker identifies any defects of the patterns.

However, the related art LCD test device has the following problems.

FIG. 3 is a sectional view illustrating where the LCD panel is mounted on the work table.

As shown in FIG. 3, because the work table 4 has an inner open area, the LCD panel 10 is connected to the probe unit 3 where it contacts the work table 4.

A middle portion of the LCD panel 10 that is not in contact with the work table 4 may sag due to self-loading. For this reason, the pad of the LCD panel 10 may not fully and properly connect with the lead pin of the probe unit 3.

In other words, an edge of the LCD panel 10 adheres to the work table 4 due to the vacuum suction, but the middle portion of the LCD panel 10 sags due to self-loading, so that the LCD panel 10 mounted on the work table 4 is misaligned a little, whereby the lead pin of the probe unit 3 is not fully and properly connected with the pad of the LCD panel 10.

If the pad of the LCD panel 10 is not fully connected with the lead pin of the probe unit 3, it is difficult to exactly identify a defect of the LCD panel 10. For this reason, the LCD panel 10 may be regarded as defective even when there is no defect. As a result, problems occur in that yield is reduced and the cost is increased.

In particular, the above problems occur more often as LCD panels 10 become larger.

SUMMARY OF THE INVENTION

Accordingly, the present invention is directed to a test device of a liquid crystal display device and a test process thereof that substantially obviates one or more of the problems due to limitations and disadvantages of the related art.

An advantage of the present invention is to provide an LCD test device and a test process thereof, in which a defect of an LCD panel is exactly identified through a full electrical connection between an LCD panel and a probe unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD test device includes a work table on which an LCD panel is mounted, a clamping unit on the work table, clamping a top surface of an edge of the LCD panel mounted on the work table, a probe unit electrically connected with a pad of the LCD panel fixed to the work table by the clamping unit, and a back light unit supplying light to the LCD panel fixed to the work table.

In another aspect of the present invention, an LCD test device includes a work table on which an LCD panel is mounted, a carrier loading/unloading the LCD panel onto the work table, a clamping unit on the carrier, clamping a top surface of an edge of the LCD panel mounted on the work table, a probe unit electrically connected with a pad of the LCD panel fixed to the work table by the clamping unit, and a back light unit that supplies light to the LCD panel fixed to the work table.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of the present invention, examples of which are illustrated in the accompanying drawings.

Wherever possible, the same reference numbers will be used throughout the drawings to refer to the same or like parts.

A test process of an LCD device according to the present invention will be described with reference to the accompanying drawings.

Figure 1:
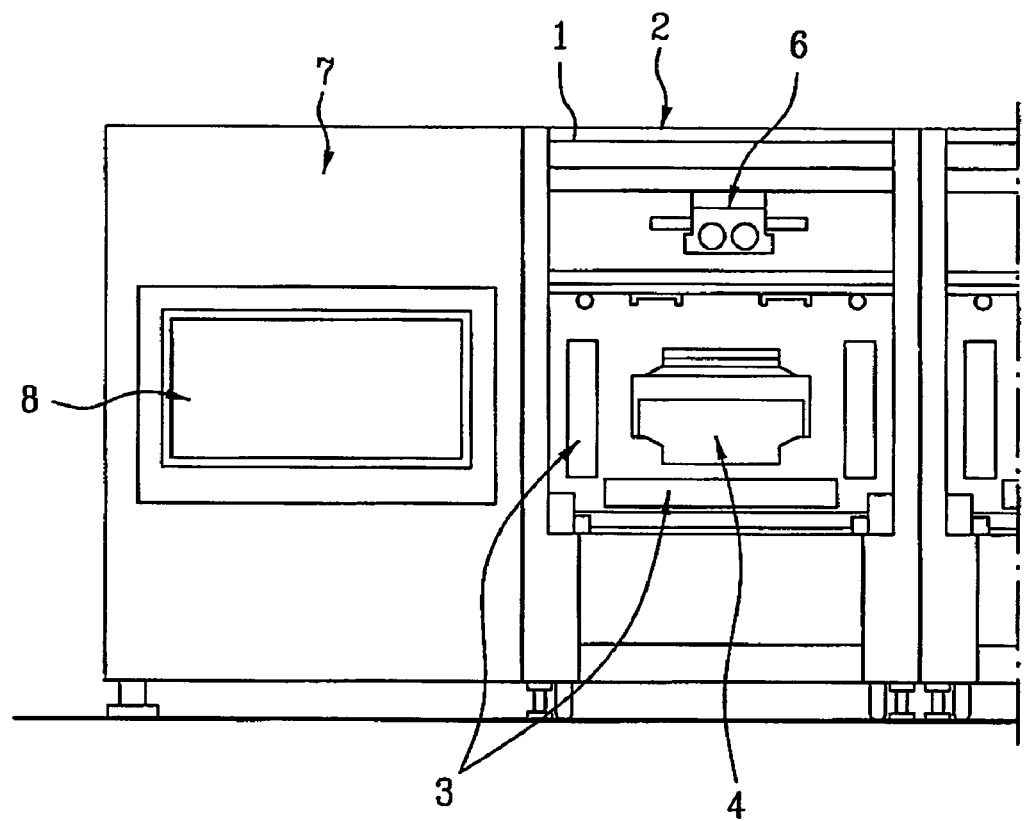
FIG. 1 is a front view illustrating a related art LCD test device.
Figure 2:
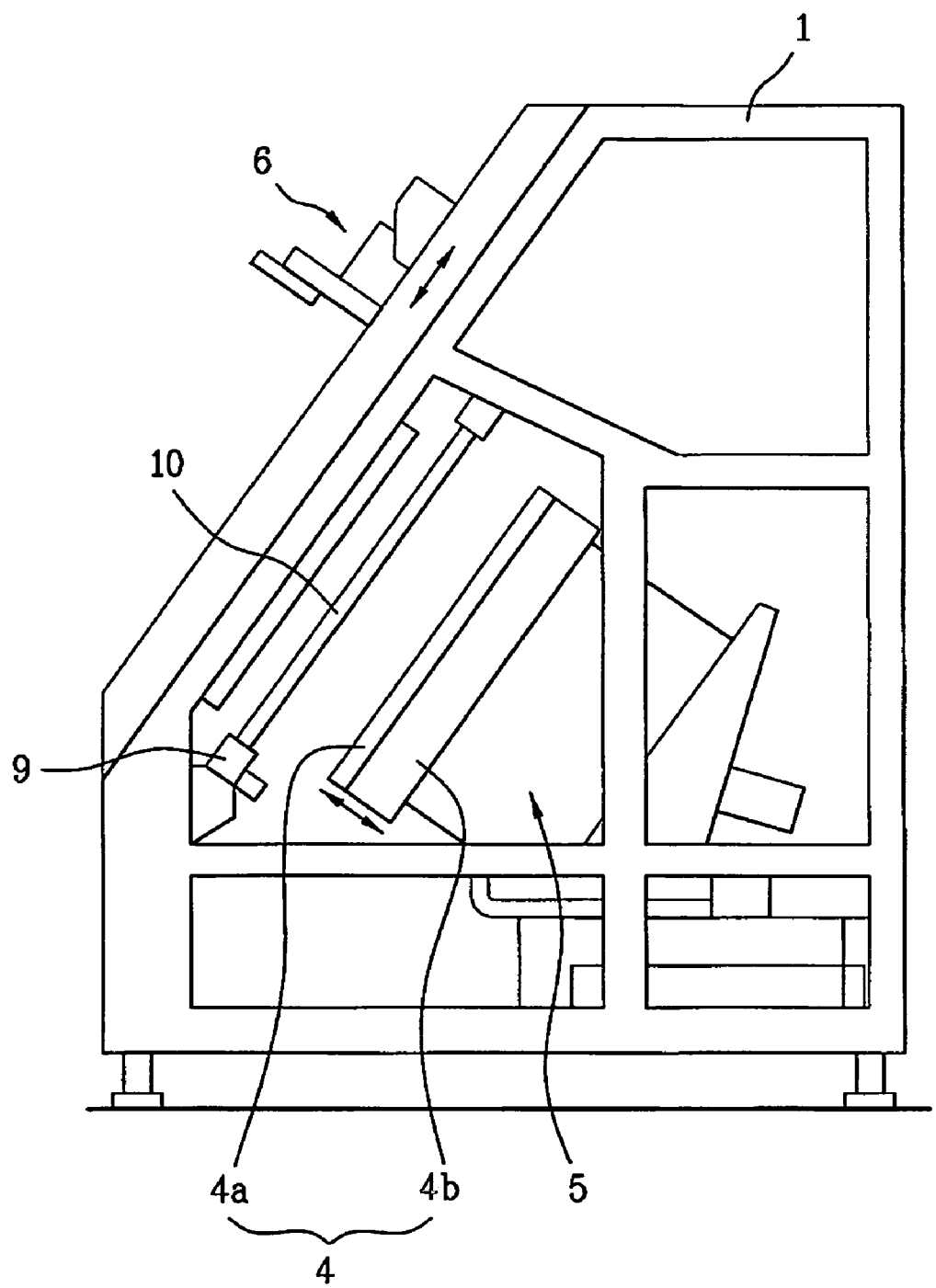
FIG. 2 is a side view illustrating a related art LCD test device.
Figure 3:
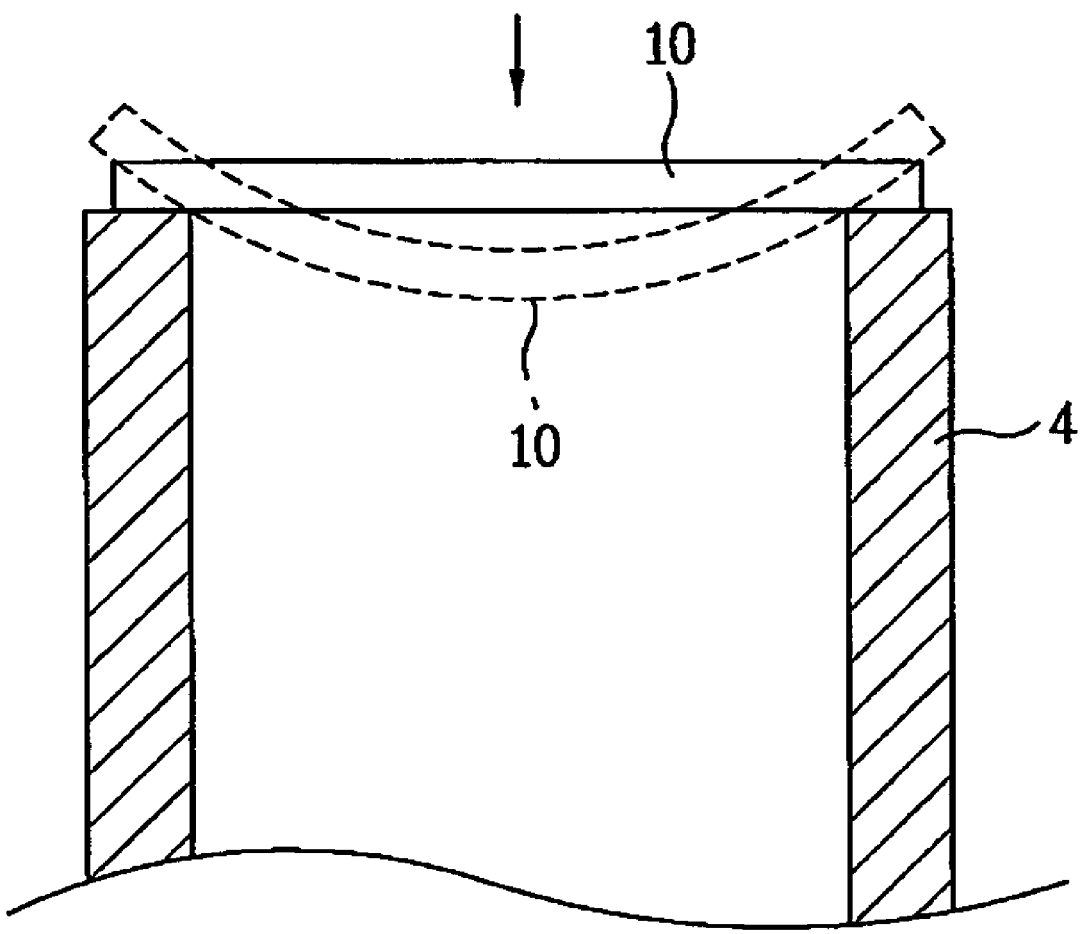
FIG. 3 is a sectional view illustrating where an LCD panel is mounted on a work table.
Figure 4:
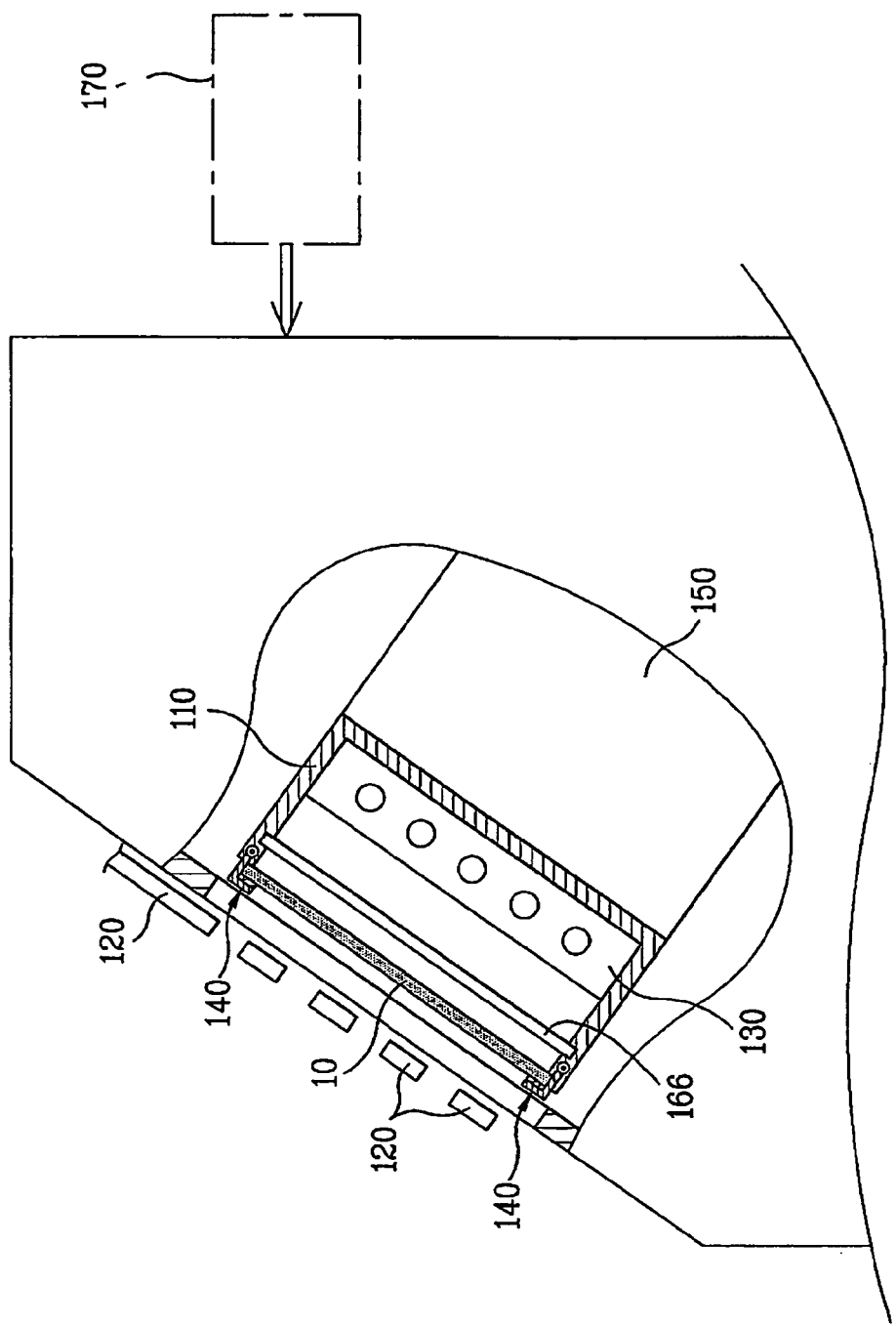
FIG. 4 is a side sectional view illustrating an LCD test device according to the first embodiment of the present invention.

FIG. 4 is a side sectional view illustrating an LCD test device according to the first embodiment of the present invention.

As shown in FIG. 4, the LCD test device according to the first embodiment of the present invention includes a work table 110, a probe unit 120, a back light unit 130, and a clamping unit 140.

The work table 110 has a rectangular box shape with an inner open or hallow area, and an LCD panel 10 is mounted on the work table 110.

The probe unit 120 is located around the side of the work table 110 and is electrically connected with a pad (not shown) of the LCD panel 10 mounted on the work table 110.

The probe unit 120 receives image signals for various patterns from a pattern generator 170 to test the LCD panel 10 and supplies the image signals to the LCD panel 10.

Also, a moving stage 150 is at the rear outside of the work table 110 to align and connect the work table 110 with the probe unit 120.

The back light unit 130 is located at the rear inside the work table 110 and supplies a light source to the LCD panel 10 mounted on the work table 110.

A cold fluorescent lamp (CFL), a cold cathode fluorescent lamp (CCFL), an external electrode fluorescent lamp (EEFL) or high luminance LED may be used as the back light unit 130.

In particular, the back light unit 130 may be in a single body with the work table 110.

A polarizer 166 is located inside the work table 110 at the front. The polarizer 166 serves to polarize the light emitted from the back light unit 130 to the LCD panel 10.

Meanwhile, the work table 110 includes the clamping unit 140 that clamps a top surface of the LCD panel 10 at the edges of the work table 110.

The clamping unit 140 improves flatness of the LCD panel 10 to exactly and electrically connect the probe unit 120 with the pad of the LCD panel 10.

In other words, if the LCD panel 10 is mounted on the work table 110 with an opening, the middle portion of the LCD panel may sag under the load of its own weight. If the clamping unit 140 clamps the top surface of the edge of the LCD panel 10, sagging of the middle portion of the LCD panel 10 is prevented, whereby flatness of the LCD panel 10 is improved, and thus the probe unit 120 is electrically and exactly connected with the pad of the LCD panel 10.

The clamping unit 140 according to the first embodiment of the present invention will be described in more detail.

Figure 5:
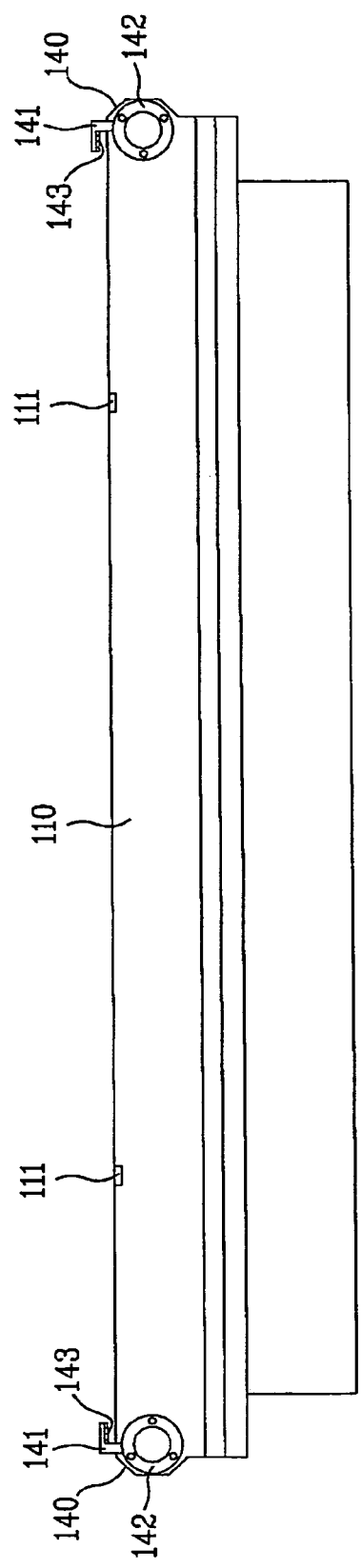
FIG. 5 is a side sectional view illustrating a structure of a clamping unit shown in FIG. 4.
Figure 6:
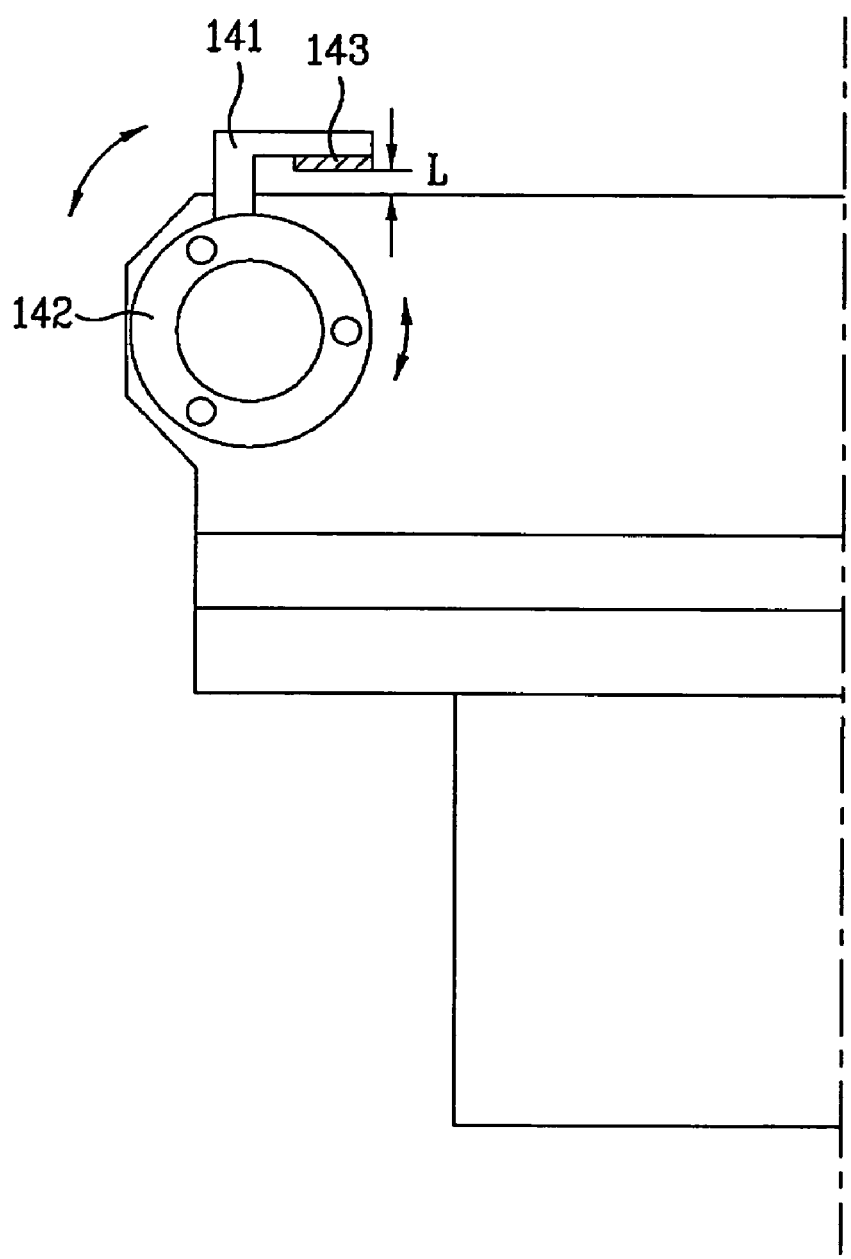
FIG. 6 is an enlarged sectional view illustrating a portion A of FIG. 5.

FIG. 5 is a side sectional view illustrating a structure of the clamping unit shown in FIG. 4, and FIG. 6 is an enlarged sectional view illustrating a portion A of FIG. 5.

As shown in FIGS. 5 and 6, the clamping unit 140 includes a clamp 141 directly clamping the top surface of the edge of the LCD panel 10 and a driver 142 rotating the clamp 141.

The clamp 141 directly contacts the LCD panel 10 and serves to clamp the top surface of the edge of the LCD panel 10 if the LCD panel 10 is mounted on the work table 110, thereby stably fixing the LCD panel 10 to the work table 110.

The driver 142 rotates the clamp 141 if the LCD panel 10 is mounted on the work table 110, so that the clamp 141 can clamp the top surface of the edge of the LCD panel 10.

The driver 142 has a rotational shaft shape and is connected with the clamp 141. Accordingly, if the driver 142 is rotated at a certain angle, the clamp 141 is also rotated in the same direction.

The process of clamping the top surface of the edge of the LCD panel 10 using the clamping unit 140 will be described in brief.

First of all, before the LCD panel 10 is mounted on the work table 110, the clamp 141 is positioned at the side of the work table 110 not the top surface of the work table 110. This is to prevent the clamp 141 from colliding with the LCD panel 10 mounted on the work table 110, thereby preventing the LCD panel 10 from being damaged and stably mounting the LCD panel 10 on the work table 110.

Afterwards, if the LCD panel 10 is mounted on the work table 110, the driver 142 rotates the clamp 142 so that the clamp 141 is positioned on the work table 110.

If the clamp 141 is positioned on the work table 110 as above, the clamp 141 naturally clamps the top surface of the edge of the LCD panel 10 mounted on the work table 110.

If the distance L between the clamp 141 and the work table 110 is greater than the thickness of the LCD panel 10, the LCD panel 10 is not clamped well. By contrast, if the distance L between the clamp 141 and the work table 110 is smaller than the thickness of the LCD panel 10, too great an external force may be applied to the LCD panel 10, and thus the LCD panel may be damaged.

Accordingly, the distance L between the clamp 141 and the work table 110 should be determined in advance considering the thickness of the LCD panel 10 mounted on the work table 110. Preferably, the distance L may be controlled depending on the thickness of the LCD panel 10.

Meanwhile, if the clamp 141 is directly in contact with the LCD panel 10 and applies a physical force to the LCD panel 10, the top surface of the edge of the LCD panel 10, which is in contact with the clamp 141, may easily be damaged by an impact transferred through the clamp 141.

Accordingly, it is preferable that the clamp 141 has a buffering member 143 to prevent the LCD panel 10 from being damaged by contact.

In this case, the buffering member 143 directly clamps the top surface of the edge of the LCD panel 10 so that the impact transferred through the clamp 141 is prevented from being directly transferred to the LCD panel 10. The buffering member 143 may be formed of an elastic material such as rubber.

Furthermore, the work table 110 preferably has a sensor (not shown) to identify whether the LCD panel 10 is mounted thereon. The sensor checks whether the LCD panel 10 has been mounted on the work table, to enable the exact operation of the clamping unit 140.

If the clamp 141 of the clamping unit 140 is rotated and thus positioned on the work table 110 before the LCD panel 10 is mounted on the work table 110, the LCD panel 10 collides with the clamp 141, whereby the LCD panel 10 is damaged and cannot be mounted on the work table 110.

Accordingly, it is preferable that the clamping unit 140 is operated after the sensor checks whether the LCD panel 10 has been mounted on the work table 110.

A plurality of vacuum pads 111 are formed on the work table 110 to secure the LCD panel 10. Accordingly, if the LCD panel 10 is mounted on the work table 110, the LCD panel 10 is fixed onto the work table 110 by the vacuum pads 111 before the clamp 141 clamps the LCD panel 10.

A test method to test the LCD panel 10 using the aforementioned LCD test device according to the first embodiment of the present invention will be described below.

First, after the LCD panel 10 is loaded into the work table 110, the LCD panel 10 is secured by the vacuum pads 111 so that the LCD panel 10 is mounted on the work table 110.

Because the clamp 141 of the clamping unit 140 is located at the side of the work table 110, the clamp 141 is prevented from being in contact with the LCD panel 10 loaded into the work table 110.

Afterwards, if the sensor checks that the LCD panel 10 has been mounted on the work table 110, the clamp 141 is rotated by the driver 142 of the clamping unit 140 so as to clamp the top surface of the edge of the LCD panel 10 mounted on the work table 110.

Of course, if the clamp 141 has the buffering member 143, the top surface of the edge of the LCD panel 10 is protected from external impact by the buffering member 143.

Once the LCD panel 10 is fixed to the work table 110, the moving stage 150 may be driven.

Then, the work table 110 is moved toward the front, and the pad of the LCD panel 10 continues to be in contact with the lead pin of the probe unit 120 so that the LCD panel 10 is electrically connected with the probe unit 120.

Under the circumstances, if the pattern generator 170 supplies a signal for displaying the images of various patterns to the LCD panel 10 through the probe unit 120, the back light unit 130 emits the light so that the light is irradiated to the LCD panel 10 and at the same time the images for the respective patterns are displayed on the LCD panel 10 to allow a worker to identify a defect of the panel using the displayed patterns.

Figure 7:
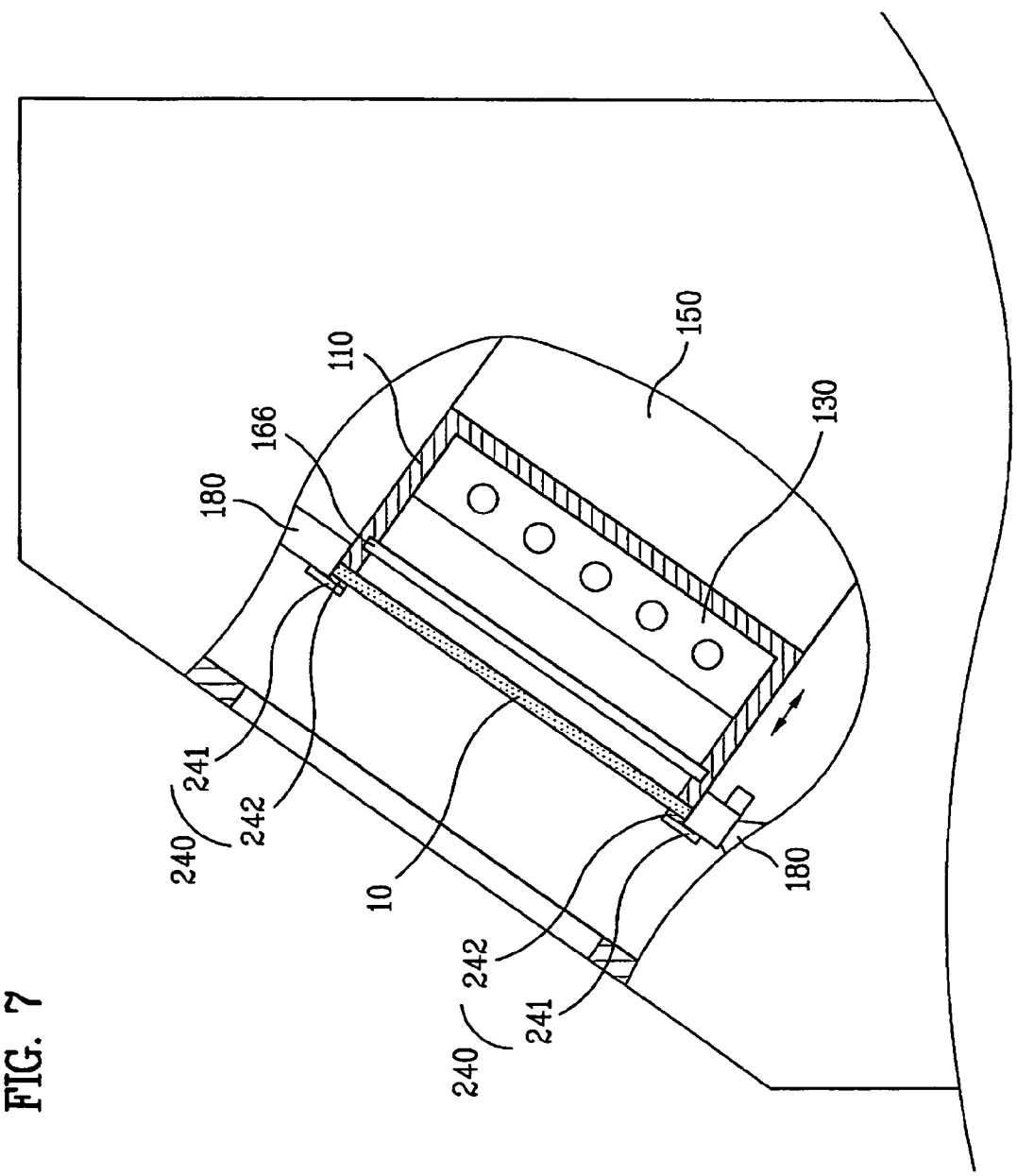
FIG. 7 is a side sectional view illustrating an LCD test device according to the second embodiment of the present invention.

FIG. 7 is a side sectional view illustrating an LCD test device according to the second embodiment of the present invention.

As shown in FIG. 7, the LCD test device according to the second embodiment of the present invention has almost the same structure as that of the first embodiment except that a clamping unit 240 is in a carrier 180 and not the work table 110.

Accordingly, the LCD test device according to the second embodiment of the present invention will be described based on the carrier 180 and the clamping unit 240.

First, the carrier 180 loads/unloads the LCD panel 10 onto the work table 110 loads the LCD panel 10 to be tested into the work table 110, and unloads the tested LCD panel 10 from the work table 110.

The clamping unit 240 is on the carrier 180 to clamp the top surface of the edge of the LCD panel 10 mounted on the work table 110.

The clamping unit 240 does not include a driver unlike the first embodiment but includes only a clamp 241. This is because the clamping unit 240 does not collide with the clamp 241 when the LCD panel 10 is mounted on the work table 110 as the clamping unit 240 is located on the carrier 180. In other words, the clamp 241 is fixed onto the carrier 180 unlike the first embodiment.

As described above, the clamping unit 240 according to the second embodiment of the present invention does not require a driver unlike the first embodiment and is fixably located on the carrier 180. Accordingly, the clamping unit 240 according to the second embodiment of the present invention has the advantage that its manufacture and installation are easier than the clamping unit 140 of the first embodiment.

Meanwhile, the clamp 241 may have a buffering member 242 to prevent the LCD panel 10 from being damaged. In this case, in the same manner as the first embodiment, the buffering member 242 directly clamps the top surface of the edge of the LCD panel 10 so that the impact transferred through the clamp 241 is prevented from being directly transferred to the LCD panel 10. Preferably, the buffering member 242 is formed of an elastic material such as rubber.

The process of clamping the top surface of the edge of the LCD panel 10 using the clamping unit 240 will be described in brief.

First, after the carrier 180 loads the LCD panel 10 into the work table 110, the carrier 180 does not return to its original position but moves downward along the side of the work table 110.

If the carrier 180 moves downward along the side of the work table 110, the clamp 241 of the clamping unit 240, which is on the carrier 180, naturally clamps the top surface of the edge of the LCD panel 10.

Afterwards, if the LCD panel 10 is completely tested, the carrier 180 moves upward along the side of the work table 110. At this time, the clamping unit 240 also moves so that the LCD panel 10 is not clamped any more.

If the LCD panel 10 is detached from the work table 110 through the above processes, the carrier 180 unloads the LCD panel from the work table 110.

As described above, the clamping unit 240 according to the second embodiment of the present invention is located on the carrier 180 to move along with the carrier 180 and to clamped the LCD panel 10.

Figure 8:
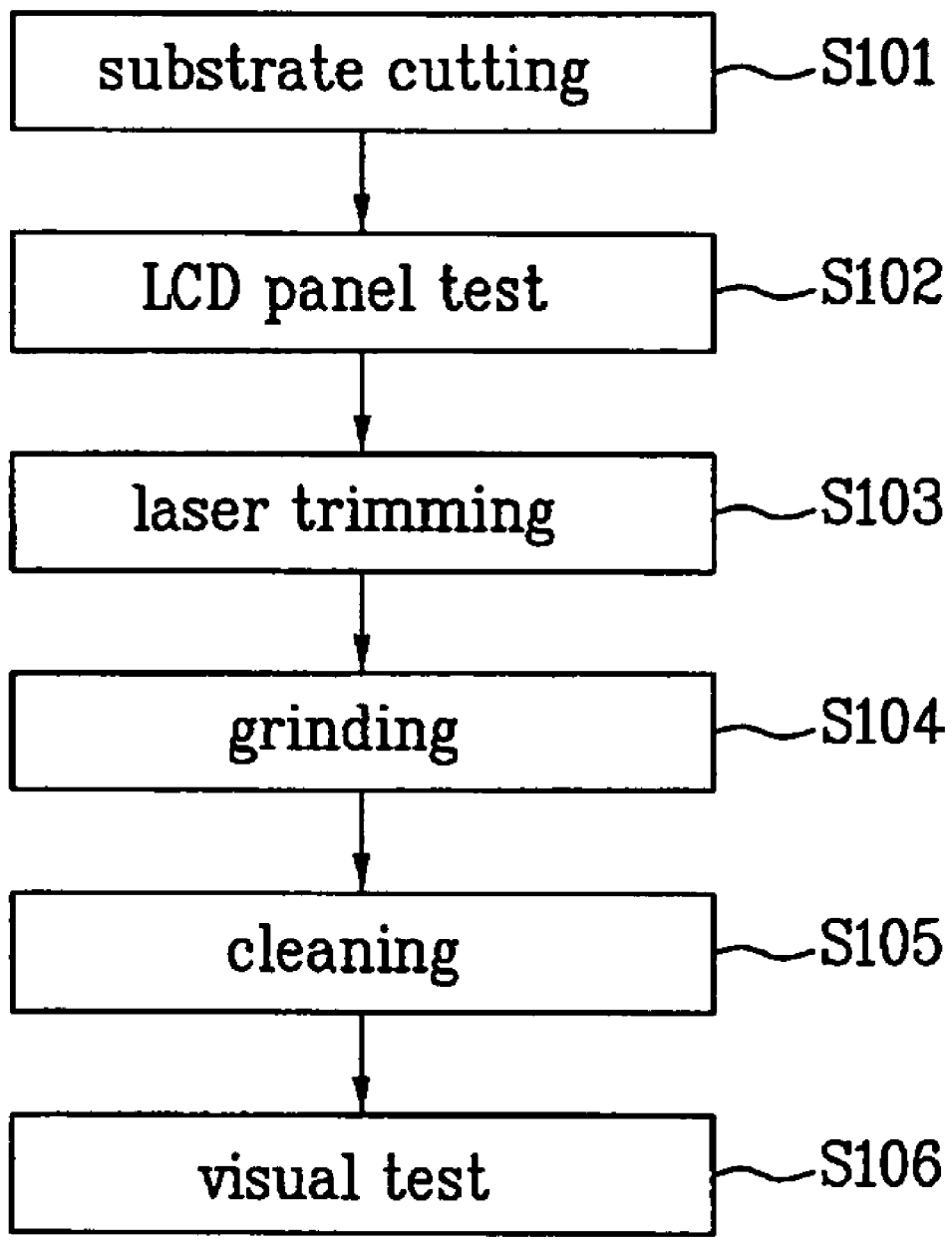
FIG. 8 is a flow chart illustrating a test process of an LCD device according to the first embodiment of the present invention.

FIG. 8 is a flow chart illustrating a test process of the LCD device according to the first embodiment of the present invention.

First, a large sized glass substrate formed by bonding an array substrate to a color filter array substrate is cut to produce several LCD panels (S101).

Afterwards, the LCD panels are loaded into an LCD test device to determine whether the LCD panels have a defect (S102).

In this case, the LCD test device includes an image device such as a camera, unlike the related art LCD test device.

Figure 9:
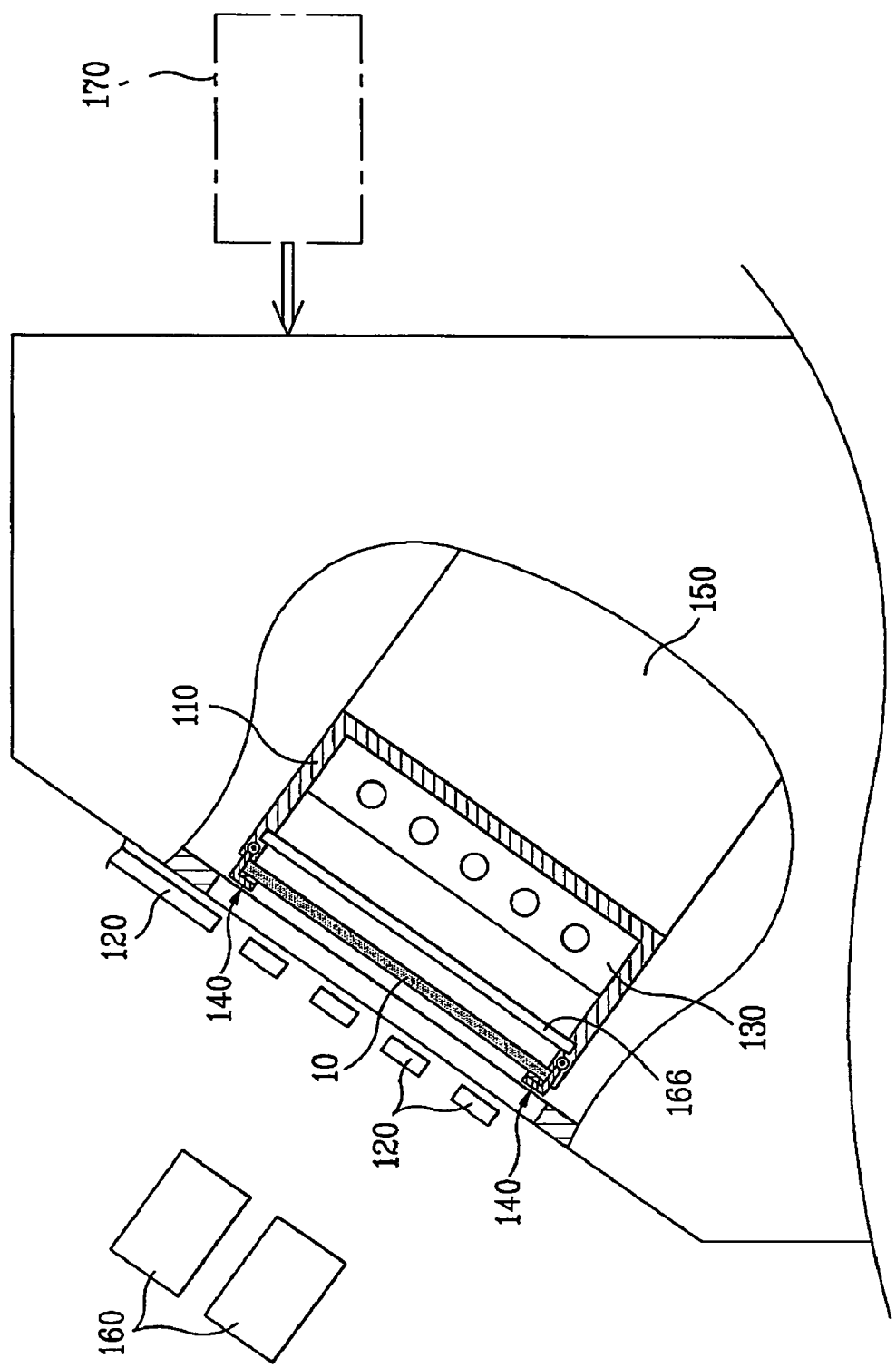
FIG. 9 is a side sectional view illustrating a brief structure of an LCD test device according to the third embodiment of the present invention.

FIG. 9 is a side sectional view illustrating a structure of an LCD test device according to the third embodiment of the present invention.

As shown in FIG. 9, the LCD test device includes a work table 110, a probe unit 120, a back light unit 130, a polarizer 166, a moving stage 150, a clamping unit 140, and an image device 160.

The LCD test device according to the third embodiment of the present invention may include the clamping unit 240 and the carrier 180 instead of the clamping unit 140.

Also, The LCD test device according to the third embodiment of the present invention may not include the clamping unit 140, 240.

The work table 110 has a rectangular box shape whose inner side is opened, and an LCD panel 10 is mounted on a front surface of the work table 110.

The probe unit 120 is around the front opening side of the work table 110 and is electrically connected with a shorting bar of the LCD panel 10 mounted on the work table 110.

The shorting bar tests the LCD panel 10 and includes a gate shorting bar 200 (see FIG. 10) for applying an electrical signal to a plurality of gate lines and a data shorting bar 300 (see FIG. 11) for applying an electrical signal to a plurality of data lines.

Accordingly, image signals for various patterns, which are provided to the probe unit 120 to test the LCD panel 10, are provided to the LCD panel 10 through the shorting bar.

The back light unit 130 is located at the rear inside the work table 110 and provides light to the LCD panel 10 mounted on the front surface of the work table 110.

The polarizer 166 is located at the front inside the work table 110 and polarized the light emitted from the back light unit 130 to LCD panel 10.

Also, the moving stage 150 is at the rear of the work table 110, and serves to align and connect the work table 110 with the probe unit 120.

The image device 160 takes images for various patterns displayed in the LCD panel 10 mounted on the front surface of the work table 110. At this time, the images for various patterns taken by the image device 160 are transmitted to a controller (not shown) such as a microcomputer, wherein the controller extracts defect information from the transmitted images.

The defect information is information regarding defects of the LCD panel 10 and includes point defects for pixels and a line defects for the gate lines and the data lines.

Preferably, the image device 160 includes a charge coupled device (CCD) camera and has resolution equal to or higher than that of the LCD panel 10.

As described above, the LCD test device takes the images for each pattern displayed in the LCD panel 10 using the image device 160, and the controller analyzes the images, so as to test whether the LCD panel 10 has a defect. Accordingly, limitation in testing the LCD panel with the naked eye a worker may be solved. As a result, working efficiency and accuracy may be improved.

Meanwhile, if the LCD panel 10 is completely tested using the aforementioned LCD test device, laser triming is performed, in which the shorting bar formed in the LCD panel 10 is removed using a laser trimmer (S103).

As described above, the shorting bar is formed to test the LCD panel 10 and is removed by the laser trimmer after the LCD panel 10 is completely tested.

If the laser trimming is completed, grinding is performed, in which the shorting bar remaining without being removed by the laser trimmer is precisely removed by a grinder (S104).

At this time, the cutting surface of the LCD panel 10 cut and sharpened by the laser trimmer is precisely grinded by the grinding process.

The shorting bar of the LCD panel 10 is completely removed by the laser trimmer and the grinder. Particularly, the grinder serves to precisely grind the cutting surface caused by the laser trimmer.

However, because the laser trimmer required in the laser trimming process is expensive, additional cost and additional processes are required, whereby productivity is deteriorated.

Accordingly, the present invention suggests a LCD panel structure that can omit the laser trimming process.

Figure 10:
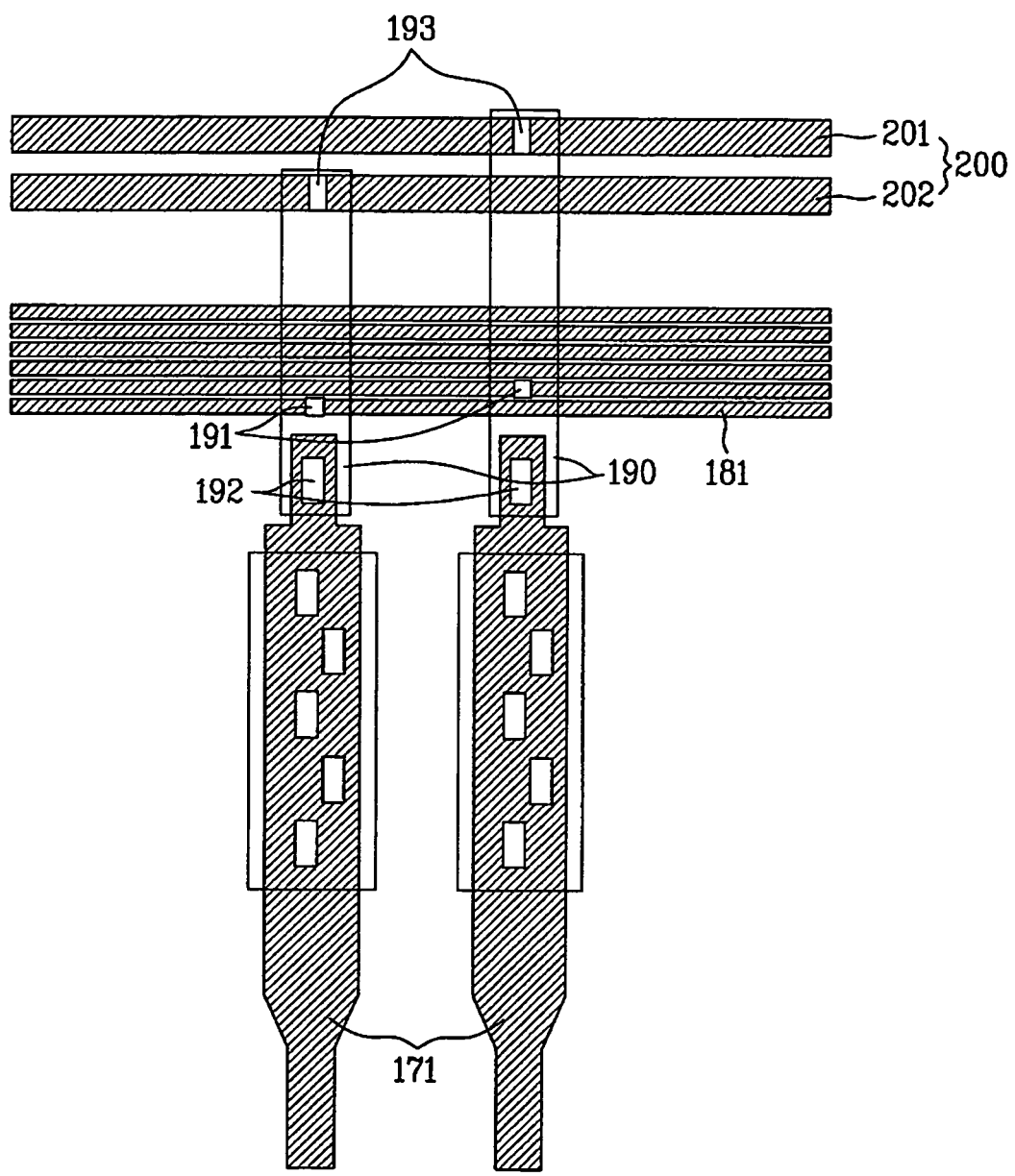
FIG. 10 is a plan view illustrating a gate pad of an LCD panel according to the present invention.
Figure 11:
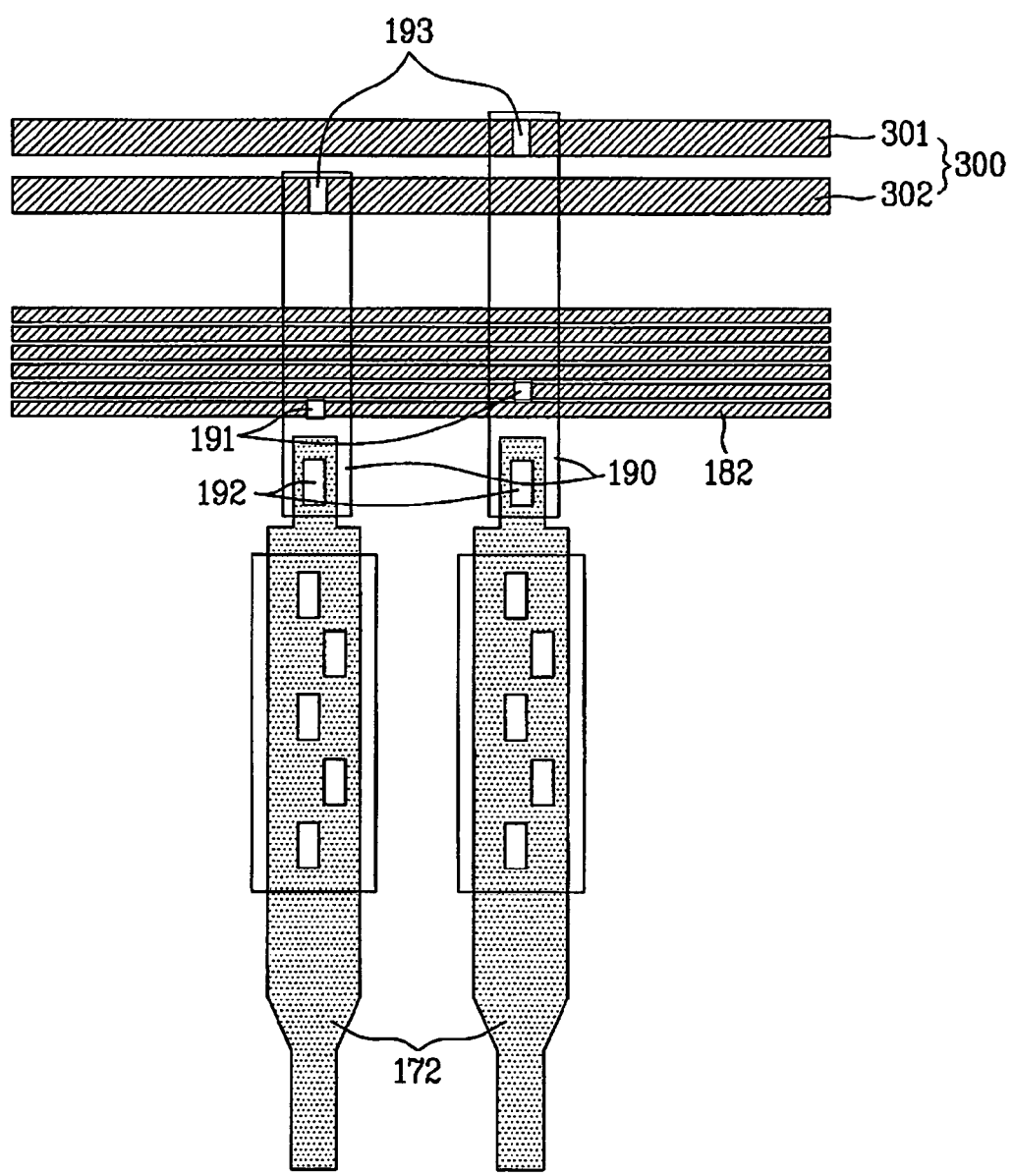
FIG. 11 is a plan view illustrating a data pad of an LCD panel according to the present invention.

FIG. 10 is a plan view illustrating a gate pad of the LCD panel according to the present invention, and FIG. 11 is a plan view illustrating a data pad of the LCD panel according to the present invention.

As shown in FIG. 10, the LCD panel according to the present invention includes a gate pad 171 formed at the end of a gate line (not shown), and a gate terminal line 181 formed at an edge of the gate pad 171.

In this case, the gate terminal line 181 is electrically connected with the gate pad 171 through a connection pattern 190.

The connection pattern 190 is connected with the gate pad 171 through a second contact hole 192 and at the same time is connected with the gate terminal line 181 through a first contact hole 191, so that the gate terminal line 181 is electrically connected with the gate pad 171.

Meanwhile, a gate shorting bar 200 is formed at an edge of the gate terminal line 181, wherein the gate shorting bar 200 is connected with the connection pattern 190 through a third contact hole 193 and thus is electrically connected with the gate pad 171.

The gate shorting bar 200 includes a first gate shorting bar 201 connected with an odd numbered gate pad 171 and a second gate shorting bar 202 connected with an even numbered gate pad 171 and detects shorts of the gate line using the difference between voltages flowing in the gate line through the first and second gate shorting bars 201 and 202.

The gate terminal line 181 and the gate shorting bar 200 may be formed in the same layer as that of the gate pad 171. In this case, the first, second and third contact holes 191, 192 and 193 are formed by removing an insulating film between a gate line layer and the connection pattern 190.

If the gate line layer is formed of AlNd having a low specific resistance, an area occupied by the gate terminal line 181 can be minimized.

Also, as shown in FIG. 11, the LCD panel according to the present invention includes a data pad 172 formed at the end of a data line (not shown) and a data terminal line 182 formed at an edge of the data pad 172.

In this case, the data terminal line 182 is electrically connected with the data pad 172 through the connection pattern 190.

The connection pattern 190 is connected with the data pad 172 through the second contact hole 192 and at the same time is connected with the data terminal line 182 through the first contact hole 191, so that the data terminal line 182 is electrically connected with the data pad 172.

Meanwhile, a data shorting bar 300 is formed at an edge of the data terminal line 182, wherein the data shorting bar 300 is connected with the connection pattern 190 through the third contact hole 193 and thus is electrically connected with the data pad 172.

The data shorting bar 300 includes a first data shorting bar 301 connected with an odd numbered data pad 172 and a second data shorting bar 302 connected with an even numbered data pad 172, and the data shorting bar 302 detects shorts in the data line using the difference between voltages flowing in the data line through the first and second data shorting bars 301 and 302.

The data terminal line 182 and the data shorting bar 300 may be formed in with a resistivity the same layer as that of the data pad 172. Because the data line layer is generally formed of Mo of 0.15 Ω/μm, its width increases.

However, if the data terminal line 182 and the data shorting bar 300 are formed simultaneously with the gate line layer, an area occupied by the data terminal line 182 may be minimized. The gate line layer may be formed of AlNd with a resistivity of 0.15 Ω/μm.

As described above, if the data terminal line 182 and the data shorting bar 300 are formed simultaneously with the gate line layer, the data shorting bar 300 may be formed with a width of 50 μm to 60 μm and six data terminal lines 182 may be formed with a width of 170 μm.

If the widths of the gate terminal line 181 and the data terminal line 182 are minimized as above, the gate shorting bar 200 and the data shorting bar 300 electrically connected with the gate terminal line 181 and the data terminal line 182 through the connection pattern 190 have minimum widths.

If the widths of the shorting bars are minimized, they may be removed completely by the grinding process without laser trimming.

In other words, because the shorting bars have great widths in the related art, problems occur in that it takes a long time to completely remove the shorting bars using only a grinder and static electricity is generated. However, if the widths of the shorting bars are reduced as above in the present invention, the shorting bars may be removed completely using only a grinder without a cutting process using a laser trimmer.

Meanwhile, if the grinding process is completed, the LCD panel 10 is sent to a cleaning process (S105). Various foreign materials adhered to the LCD panel 10 in the grinding process are removed by the cleaning process.

The LCD panel 10 which has completely undergone the cleaning process is sent to a visual test process to be tested with the naked eye of a worker to determine whether the LCD panel 10 has a defect (S106).

This visual test is to test only the LCD panels that have a defect detected through the test process performed using the LCD test device, and the worker re-tests the LCD panel with the naked eye to finally decide whether the LCD panel has a defect.

Figure 12:
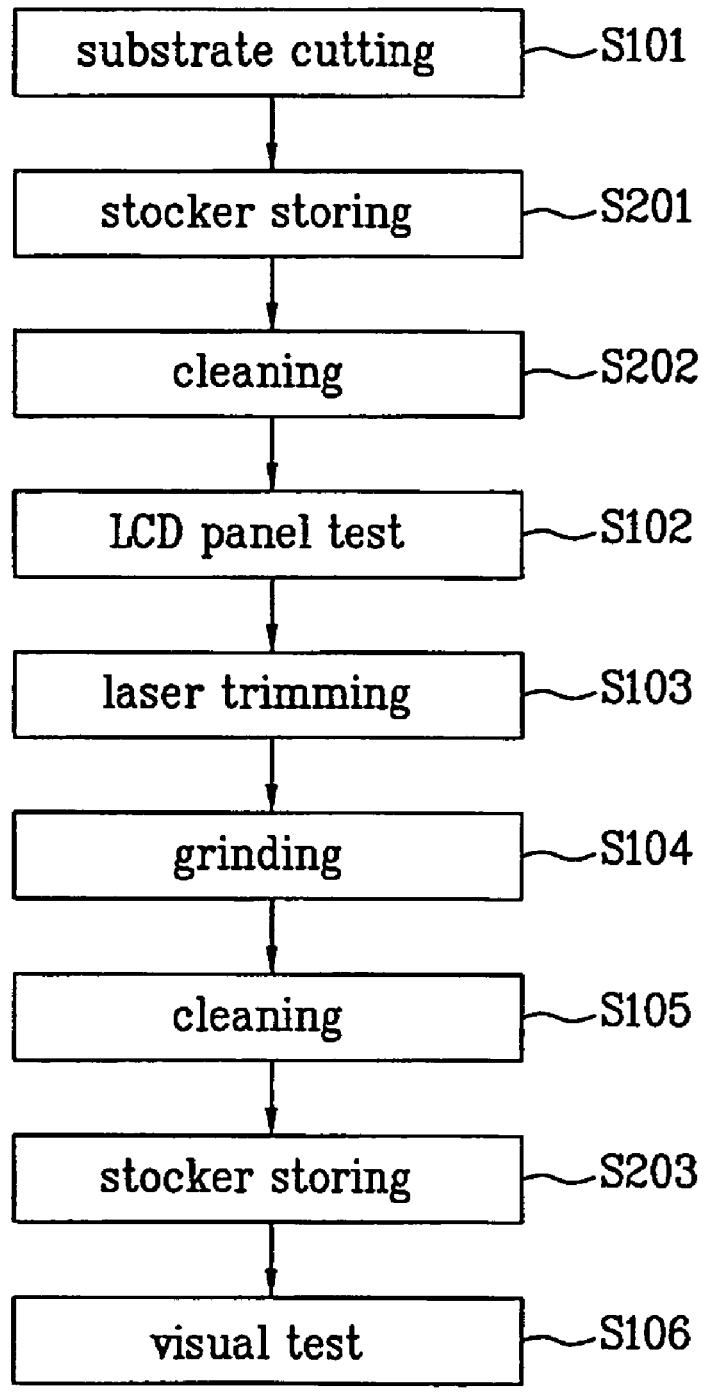
FIG. 12 is a flow chart illustrating a test process of an LCD device according to the second embodiment of the present invention.

FIG. 12 is a flow chart illustrating a test process of the LCD device according to the second embodiment of the present invention.

As shown in FIG. 12, the test process of the LCD device according to the second embodiment of the present invention further includes a cleaning process (S202) for removing surface foreign materials before the cut LCD panels 10 are loaded into the LCD test device.

It is likely that various foreign materials may be adhered to the LCD panels formed by cutting the large sized glass substrate. Accordingly, if the foreign materials adhered to the LCD panels are removed in advance by the cleaning process, the LCD panels may be tested more accurately The test process of the LCD device according to the second embodiment of the present invention may further include the process (S201) for entering the LCD panels in a stocker before the cleaning process (S202) and the LCD panel test process (S102).

The stocker stores the LCD panels during the process and is stored in a cleaned environment. Accordingly, if the LCD panels are not directly loaded into the LCD test device or are not sent to the cleaning process, it is preferable that the LCD panels enter the stocker so that they are kept clean.

The process for entering the LCD panels into the stocker and storing them therein may be performed before the visual test (S203).

In other words, even if the visual test is not performed directly after the LCD panels from which the shorting bars are removed are cleaned, it is preferable that the LCD panels enter the stocker so that they are stored in a clean environment.

If the LCD panels are stored in the stocker to be kept in a clean environment, a more exact test result may be obtained in the test process using the LCD test device and the visual test.

As described above, the test process of the LCD device according to the present invention has the following advantages.

First, because the top surface of the edge of the LCD panel mounted on the work table is clamped by the clamping unit, sagging of the middle portion of the panel is prevented, thereby improving the flatness of the panel and exactly and electrically connecting the probe unit with the pad of the LCD panel. Accordingly, because the defect of the LCD panel may be tested more exactly, reliability of the test is improved, and it is possible to prevent yield from being reduced and the cost increased in advance. In particular, because the large sized LCD panel is stably fixed to the work table through the clamping unit, exactness of the test is remarkably improved.

Second, because the LCD test device takes the images for each pattern displayed in the LCD panel using an image device such as a CCD camera and the controller analyzes the taken images so as to test whether the LCD panel has a defect, limitations in testing the LCD panel with the naked eye of a worker can be solved, whereby working efficiency and accuracy can be improved.

Third, because no expensive laser trimmer for removing the shorting bars is required, additional cost for the expensive laser trimmer can be avoided and the number of process steps may be reduced, whereby productivity may be improved.

Finally, because the cleaning process is performed before the LCD panels are loaded into the LCD test device or the LCD panels are entered into the stocker so as not to be contaminated by foreign materials, any defects in the LCD panels may be detected more exactly.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An LCD test device comprising:
   a work table on which an LCD (Liquid Crystal Display) panel is mounted;
   a clamping unit on the work table, clamping a top surface of an edge of the LCD panel mounted on the work table, thereby preventing sagging of the middle portion of the LCD panel;
   a probe unit electrically connected with a pad of the LCD panel fixed to the work table by the clamping unit; and
   a back light unit supplying light to the LCD panel fixed to the work table.

2. The LCD test device as claimed in claim 1, wherein the clamp unit includes:
   a clamp directly clamping the top surface of the edge of the LCD panel; and
   a driver rotating the clamp to allow the clamp to clamp the top surface of the edge of the LCD panel when the LCD panel is mounted on the work table.

3. The LCD test device as claimed in claim 2, wherein the clamp has a buffering member to prevent the LCD panel from being damaged by contact.

4. The LCD test device as claimed in claim 3, wherein the buffering member is formed of an elastic material such as rubber.

5. The LCD test device as claimed in claim 1, wherein the work table has a sensor to check whether the LCD panel has been mounted thereon.

6. The LCD test device as claimed in claim 1, further comprising an image device taking images of patterns displayed on the LCD panel mounted on the work table.

7. The LCD test device as claimed in claim 6, further comprising a controller extracting defect information from the images for patterns displayed on the image device.

8. An LCD test device comprising:
   a work table on which an LCD (Liquid Crystal Display) panel is mounted;
   a carrier loading/unloading the LCD panel onto the work table;
   a clamping unit on the carrier, clamping a top surface of an edge of the LCD panel mounted on the work table, thereby preventing sagging of the middle portion of the LCD panel;
   a probe unit electrically connected with a pad of the LCD panel fixed to the work table by the clamping unit; and
   a back light unit that supplies light to the LCD panel fixed to the work table.

9. The LCD test device as claimed in claim 8, wherein the clamp unit has a buffering member to prevent the LCD panel from being damaged by contact.

10. The LCD test device as claimed in claim 9, wherein the buffering member is formed of an elastic material such as rubber.

11. The LCD test device as claimed in claim 8, further comprising an image device taking images of patterns displayed on the LCD panel mounted on the work table.

12. The LCD test device as claimed in claim 11, further comprising a controller extracting defect information from the images for patterns displayed on the image device.

13. A test process for an LCD device, comprising:
    preparing several LCD (Liquid Crystal Display) panels by cutting a large sized glass substrate;
    loading the LCD panels into an LCD test device having an image device;
    clamping a top surface of an edge of the LCD panels to fix the LCD panels in the LCD test device, thereby preventing sagging of the middle portion of the LCD panels; and
    testing whether the LCD panels have a defect, using the image device.

14. The test process as claimed in claim 13, wherein the image device is a charge coupled device (CCD) camera.

15. The test process as claimed in claim 13, further comprising:
    removing shorting bars formed in the LCD panels using a laser trimmer; and
    completely removing the remaining shorting bars, using a grinder.

16. The test process as claimed in claim 15, further comprising:
    cleaning the LCD panels from which the shorting bars are removed; and
    directly testing the cleaned LCD panels with a naked eye of a worker to finally determine whether the LCD panels have a defect.

17. The test process as claimed in claim 13, further comprising removing shorting bars formed in the LCD panels using a grinder.

18. The test process as claimed in claim 17, wherein the shorting bars include a gate shorting bar connecting gate lines of the LCD panels and a data shorting bar connecting data lines of the LCD panels, the gate shorting bar being formed of the same material as that of the data shorting bar.

19. The test process as claimed in claim 18, wherein the gate shorting bar and the data shorting bar are formed of AlNd.

20. The test process as claimed in claim 17, further comprising:
    cleaning the LCD panels from which the shorting bars are removed; and
    directly testing the cleaned LCD panels with a naked eye of a worker to finally determine whether the LCD panels have a defect.

21. The test process as claimed in claim 20, wherein only the LCD panels, which are determined to have a defect using the LCD test device, are finally tested.

22. The test process as claimed in claim 20, further comprising entering the LCD panels in a stocker and storing them therein before the LCD panels are finally tested.

23. The test process as claimed in claim 13, further comprising removing surface foreign materials by cleaning the LCD panels.

24. The test process as claimed in claim 13, further comprising entering the LCD panels in a stocker and storing them therein before the LCD panels are loaded into the LCD test device.

* * * * *